July 14, 1936.　　　K. E. PORTER　　　2,047,705
REEL
Filed March 8, 1934
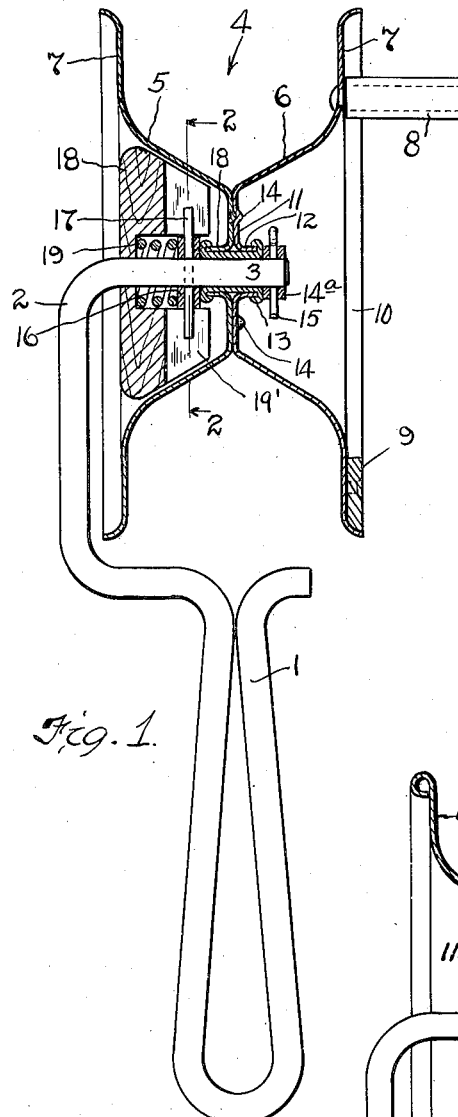
Fig. 1.
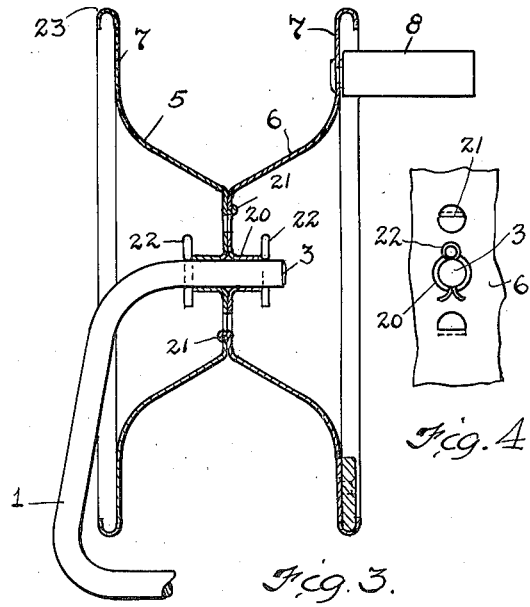
Fig. 3.
Fig. 4.
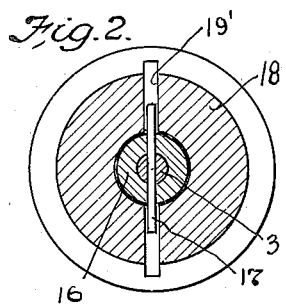
Fig. 2.
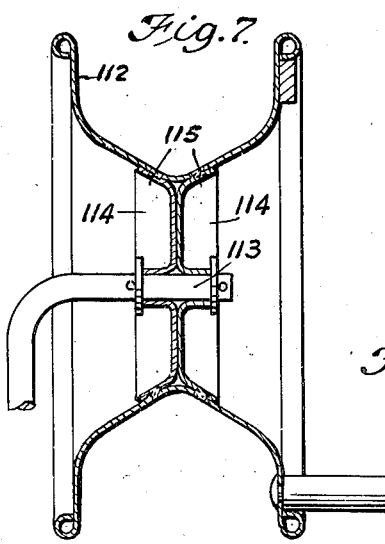
Fig. 7.
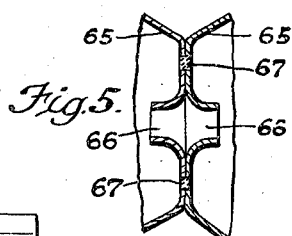
Fig. 5.
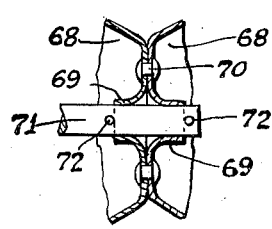
Fig. 6.
INVENTOR.
Kenneth E. Porter
BY Fay, Oberlin & Fay
ATTORNEYS.

Patented July 14, 1936

2,047,705

UNITED STATES PATENT OFFICE 2,047,705

REEL

Kenneth E. Porter, Shaker Heights, Ohio

Application March 8, 1934, Serial No. 714,567

2 Claims. (Cl. 242—99)

This invention relates as indicated to reels generally and various constructions comprising adaptations of the principles of my invention may be used for various purposes such as in flying kites, fishing, reeling and storing clothes lines, electrical extension cords, contractors' chalk lines and the like.

It is among the objects of my invention to provide a reel construction characterized by simplicity and low cost of manufacture.

It is a further and more particular object of my invention to provide a reel construction in which the handle part thereof is provided with an integral extension upon which the spool portion of the reel directly rotates.

It is a further object of my invention to provide a particular type of spool construction for the reel characterized by the employment of light and inexpensive sheet metal parts so formed and fabricated as to produce a structure having the necessary rigidity and durability but which may be manufactured at a relatively low cost.

It is a further object of my invention to provide a simple and effective braking device adapted for manual actuation and whereby the rotation of the spool portion of the reel may be quickly and effectively braked.

Other objects of my invention will appear as the description proceeds.

To the accomplishment of the foregoing and related ends, said invention, then consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:

Fig. 1 is a part sectional, part elevational view of one form of reel embodying certain of the principles of my invention; Fig. 2 is a transverse sectional view of a portion of the structure illustrated in Fig. 1 taken on a plane substantially indicated by the line 2—2; Fig. 3 is a fragmentary, part sectional, part elevational view of another form of reel somewhat similar to that illustrated in Fig. 1 but employing a different form of mounting for the spool upon the axle member supporting the same; Fig. 4 is a fragmentary, side elevational view of a portion of the spool illustrated in Fig. 3; Fig. 5 is a fragmentary sectional view of a spool showing a particular formation of the inner portions of the spool sections whereby such spool may be directly mounted upon its supporting axle; Fig. 6 is a sectional view of a spool somewhat similar to that illustrated in Fig. 5 but differing therefrom in the means employed for securing together the two sections of the spool body; and Fig. 7 illustrates another form of reel constructed in accordance with the principles of my invention and characterized by a spool structure in which the flanged portion thereof is formed from a single piece with two complementary sheet metal hub members supporting the same on the axle.

Referring now more specifically to the drawing and more especially to Figs. 1 and 2, the reel construction illustrated in these figures consists generally of a handle portion 1, which is formed preferably of some suitable rigid, round stock, such as a steel bar. The remote end 2 of the handle portion 1 is rebent at substantially right angles to the main body of the handle and the terminal portion 3 thereof serves as an axle upon which the spool assembly, generally indicated at 4, is directly rotatably mounted.

The spool assembly, generally indicated at 4, consists of two substantially frusto-conical sheet metal members 5 and 6, which are provided with substantially radially extending flanges 7 to laterally confine the cord, cable or the like wound upon the spool. One of the flanged portions 7, i. e., that lying on the opposite side of the handle 2, is provided with a handle 8 suitably riveted or otherwise secured to the flange 7 and by which the reel spool may be rotated. Secured to the flange 7 carrying the handle 8 and at a point preferably diametrically opposite to such handle there is secured a counterweight 9 which will be of the same weight as the handle 8 and preferably will not extend laterally beyond the line 10 defining the edge of one of the flanges 7.

The frusto-conical sheet metal members 5 and 6 are arranged in abutting relation as at 11 and each of such frusto-conical members is centrally provided with oppositely directed substantially cylindrical extensions, which, in the modification illustrated in Fig. 1, are in telescopic engagement with a thimble 13 which serves as the bearing hub for the spool. The ends of the thimble 13 are peened over, particularly to secure the sections 5 and 6 against relative axial displacement. The sections 5 and 6 are also provided with complementary struck-out portions 14 which interlock and hold such members against relative rotation on the thimble or hub 13. On the end of the axle extension 3 of the handle portion of the reel, there is secured a collar 14ª by some suitable means such as a cotter pin 15. Another collar 16 is secured to the axle portion 3 of the handle in such spaced relation to the collar 14 as to provide a rolling groove therebetween for the spool supported on the thimble 13. The collar 16 is secured to the axle portion by means of a pin 17.

Mounted coaxially upon the shaft portion 3 of the handle is a brake block 18 of generally frustro-conical shape and provided with a transversely extending slot 19', which extends axially only part way through the block 18. The block 18 is normally held out of engagement with the spool by means of a spring 19 which is compressed when the block is moved axially to the right, as viewed in Fig. 1, into engagement with the spool, which movement may be conveniently effected by a slight pressure of the thumb of the user's hand in which the reel is grasped. The block 18 is, of course, prevented from moving axially to the left for any great distance from its position, as illustrated in Fig. 3, by reason of the handle upon which the same is mounted being bent at substantially a right angle just to the left of the block.

The modification illustrated in Figs. 3 and 4 differs from that illustrated in Fig. 1 and just described in two principal respects, i. e., the manner in which the spool is mounted on its supporting axle and the manner in which the sheet metal members 5 and 6 are secured together against axial displacement and relative rotation. In Fig. 3 the sheet metal members 5 and 6 comprising the body of the spool are centrally provided with oppositely directed cylindrical extensions 20 which directly engage and provide the bearing support for the spool. When the hub or thimble is thus omitted, as in this case, some means should be provided for maintaining the sections 5 and 6 of the spool in proper assembled relation so that there may be no circumferential or axial displacement between these parts. This is conveniently accomplished by the provison of a plurality of struck-out portions 21 on one of the sheet metal members, which struck-out portions extend through openings in the other member and when bent over, secure the two parts firmly together. Pins 22 are, of course, provided which extend through the extension 3 of the handle so as to secure the spool against axial displacement on the handle. It may be pointed out that the circumferential edges of the flanges 7 in this construction are rebent, as at 23, to a much greater extent than in the construction illustrated in Fig. 1. This rebent edge of the flanged members not only serves to additionally strengthen such members but also eliminates the occurrence of a sharp edge on the sides of the spool which, when such spool is rotating at a relatively high speed, might cut the hand of the user if inadvertently pressed thereagainst.

As illustrated in Fig. 5, the central portions of the spool members 65, similar to the spool members in at least certain of the previously described figures, may be centrally provided with oppositely extending cylindrical extensions 66 which may have direct bearing on the extension of the handle forming the axle for the spool and thus afford the proper bearing support for the spool without the use of any intermediate sleeve or thimble. When such construction is employed, some means such as spot-welding at 67 should be resorted to in order to secure the spool sections together against rotation and axial displacement.

As illustrated in Fig. 6, the spool sections 68, similar to those illustrated at 65 in the previous figure and similarly provided with cylindrical extensions 69, may be secured together by means of rivets such as 70. This particular construction, whereby the inner portions of the spool sections have direct bearing engagement with the spindle or axle extensions 71 of the handle of the reel, produces a construction which is characterized by its simplicity and low cost of manufacture without any sacrifice as to durability. Pins such as 72 are, of course, employed to secure the spool to the shaft such as 71, when this form of construction is used.

It will be noted that in all of the constructions described above and variously illustrated in Figs. 1 to 6, the spool portion of the reel has been illustrated and described as formed from two coniform sheet metal members which are secured together and rotatably supported on the axle extension of the handle. The principles of my invention are, however, applicable to modifications of this principle as more particularly illustrated in Fig. 7.

The reel illustrated in Fig. 7 is different from any previously described in that the cord-supporting flanged portion of the spool, generally indicated at 112 is formed from a single piece of circularized flat stock which may be rolled, drawn or suitably formed so as to conform to the shape illustrated in the drawing. This peripheral member may, as above indicated, be formed from a flat strip of steel or suitable material which is first circularized and then welded into a complete annulus, after which well known forming operations may be resorted to in order to impart to such circular blank the shape illustrated in the drawing. The member 112 is supported on the axle 113 by means of two complementary spider or hub members 114 which are substantially frustro-conical, being at their outer edges 115 welded or otherwise suitably secured to the member 112 and at their inner edges, bearing directly on the axle 113.

In all of the above described modifications, particularly where the spool has been referred to as formed of a plurality of complementary sheet metal members, one or more of which may bear directly upon the axle supporting the spool, it is to be understood that a bearing sleeve or bushing may be inserted between such sheet metal members and the axle in order to provide a superior bearing if this may be desired.

It will be noted from the foregoing description that a reel for any of the previously enumerated types of use is characterized by the fact that in most of its various forms it contains only a single bearing and furthermore, that the spool of the reel revolves on an extension of the handle. The entire reel, with the exception of certain forms of braking appliances, is constructed of metal, steel or aluminum being preferred, and it is important to note that substantially the entire construction may be made of stampings, which materially reduces the cost of manufacture.

In all of the foregoing described constructions and those illustrated in the drawing, the bearings have been shown as plain bearings. It is to be understood, of course, that for certain types of use, bushings may be inserted in the hub of the spool and for certain more expensive types of construction, ball or roller bearings may be employed.

It will be observed that several different expedients have been illustrated and described whereby the spool sections may be secured together such as by riveting, welding, indenting and the provision of cut-out portions which interlock, particularly as illustrated in Figs. 3 and 4. It is to be understood that any of these expedients or the equivalent thereof may be used in any particular embodiment of my invention. It may be that for certain types of construction, one form or the other may be employed in order to facilitate manufacture and consequently reduce the cost of the article.

The handles by which the spools are rotated, while not particularly described, may either be formed from a solid, smooth shaft riveted or otherwise secured to the spool or a shaft carrying a rotatable sleeve such as is illustrated in Fig. 7, may be employed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a hand reel, the combination of a handle member provided with a spool supporting extension, and a spool assembly rotatably mounted on said extension and including two frustro-conical sheet metal members arranged in abutting relation and secured against relative rotation, said sheet metal members centrally provided with oppositely directed substantially cylindrical extensions rotatably embracing said first-named extension and providing bearing support for the spool.

2. In combination in an article of the character described, a supporting member comprising a handle and bearing element aligned with said handle and extending transversely thereof, said handle and said bearing element being parts of an integral rod, a reel formed of two frustro-conical members of sheet metal secured in fixed abutting relation and rotatably mounted on said bearing element and a braking block slidably mounted on said bearing element adjacent said reel on the handle side thereof and adapted to be manually moved axially of said bearing element into braking engagement with said reel.

KENNETH E. PORTER.